Figure 1:
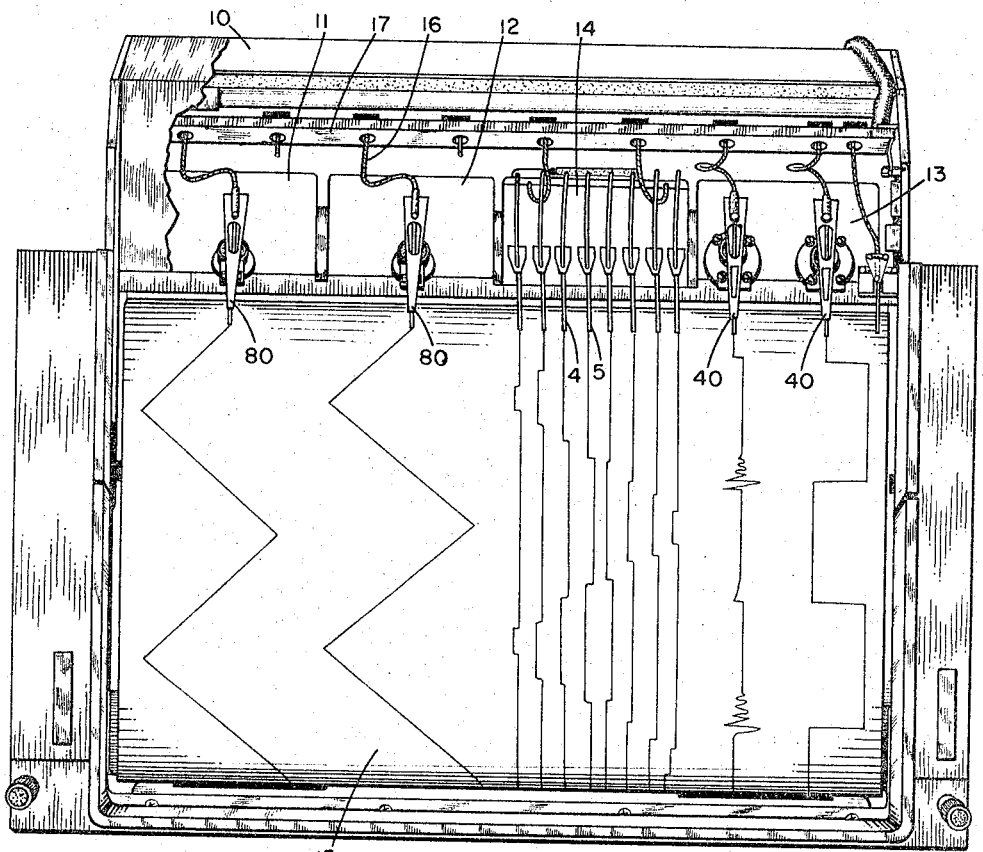

April 4, 1967

M. S. HARTLEY ETAL  3,312,977
MULTICHANNEL DIRECT WRITING OSCILLOGRAPH
AND RECORD MEMBER THEREFOR
Filed April 21, 1965

INVENTORS
MAURICE S. HARTLEY
ALLAN R. THOMPSON
FRANK P. ZAFFARANO

BY

ATTORNEY

United States Patent Office 3,312,977
Patented Apr. 4, 1967

3,312,977
MULTICHANNEL DIRECT WRITING OS-
CILLOGRAPH AND RECORD MEMBER
THEREFOR
Maurice S. Hartley, Cleveland, Allan R. Thompson, West-
lake, and Frank P. Zaffarano, Rocky River, Ohio, as-
signors to Clevite Corporation, a corporation of Ohio
Filed Apr. 21, 1965, Ser. No. 449,729
5 Claims. (Cl. 346—49)

This invention pertains to a multichannel oscillograph recording system, and more particularly to the record chart for such a multichannel system.

The recording system and the record chart of this invention may utilize any one of a number of known writing techniques such as ink, thermal, pressure, electric, wax or the like, but since ink writing is one of the more popular the invention will be described in connection therewith, though it is not limited thereto.

In the past single channel pen recorders were utilized to write on a moving strip of paper, and soon thereafter two or more pen recorders were mounted side by side to write on a single moving strip of paper of increased width, thereby greatly increasing the information that could be recorded, and to correlate timewise an event on one channel with events on other channels. In the past these multichannel recorders, as they are called, generally utilized identical penmotor devices to actuate the recording instrument. Thus in the several channels of information the pens were similar, the penmotors were similar, and the driving electronics to the penmotor were similar. Consequently, the record chart needed only a simple printed grid pattern with printed centerlines for the several channels and the operating engineer could read each channel separately or he could determine a time-wise relationship between channels.

Today's engineer demands more accurate information, he demands more information, and he does not want to pay any more for it than he has to. In order to increase reliability and accuracy; together with beauty and permanence of record, there has been developed a pressurized inking system which has been shown, described and claimed in United States Letters Patent 3,054,109, issued to A. Dix Brown, Jr., now reissue Patent 25,692, issued Dec. 1, 1964, for Balanced Hydrostatic Inking System, and assigned to the same assignee as the present invention. In order to supply a plurality of pens with ink under pressure a manifold system was developed which is shown and described in United States patent application Ser. No. 265,394, filed Mar. 15, 1963, in the name of Earl O. Schweitzer, for a Recorder and Inking System Therefor, and assigned to the same assignee as the present invention. In the system described by the Brown patent and the Schweitzer application all of the pen tips are sealed against the record medium during a recording operation, even though maybe only one or two of the many pens is actually recording an incoming signal. The unused pens merely record a straight line and it is easy for the operator to distinguish the operative pens.

With the demand for more accuracy and flexibility of the pen recorder systems a modular system has been devised, and a wider range of pen recorders has been provided. Thus the assignee of this invention now sells an analog penmotor device which has an excursion of about 80 mm. to provide increased accuracy and readability, and also sells a twin 40 mm. analog device for increased number of record channels. The twin 40 penmotor may be mounted on the chassis of the multichannel unit in place of one 80 mm. device. There is also offered a single unit which contains eight "event marker" penmotors and pens which can be mounted on the chassis in place of one 80 mm. penmotor or in place of one twin 40 mm. penmotor. Suitable amplifier channels are provided for the number of penmotors and event markers which are connected to the chassis. This modular system permits the engineer to mix highly accurate 80 mm. analog penmotors with 40 mm. analog penmotors and with a large number of event markers. A chassis which is big enough for four penmotor modules can give the engineer 81 different combinations of penmotors and penmotor locations. However, with this wide range available it became difficult for an engineer at a later date to unambiguously read or refer to a record made on the usual record chart. Record charts were available for the 80 mm. penmotor unit, and record charts were available for the twin 40's and for the event markers. However, no one record chart has been available for clearly reading the records made by each of the several modules.

It is, therefore, an object of this invention to provide a specially ruled recording chart for use in a multichannel direct writing oscillograph system, whereby the chart channels may be unambiguously identified or referred to when written on by any one of a plurality of different recording instruments.

Another object of the invention is to provide a multichannel direct writing oscillograph system wherein any of a plurality of different recording devices will write on a specially ruled record chart so that the record can be unambiguously read.

Still another object of the invention is to provide a specially ruled record medium which has the characteristic when written upon by the pens of a multichannel recording oscillograph, of identifying which one of the several writing devices including its amplifier, and its input controls, made of the record trace.

For a better understanding of the present invention, together with other and further objects thereof, reference is had to the following description taken in connection with the accompanying drawings, and its scope will be pointed out in the appended claims.

An aspect of the invention lies in the provision of a multichannel direct writing oscillograph comprising a first direct writing instrument capable of lateral movement throughout a given distance w, and a plurality of second direct writing instruments each capable of lateral movement throughout a distance x which is less than the distance w. These second direct writing instruments are mounted side by side with a space between them which is greater than x so that the tips of the writing instruments do not touch each other in normal maximum amplitude writing. A record chart is provided which has printed on it two or more grid patterns superimposed on each other, one for the first writing instrument and the other(s) for the plurality of second writing instruments, and means drive the paper past the writing instruments.

Figure 2:
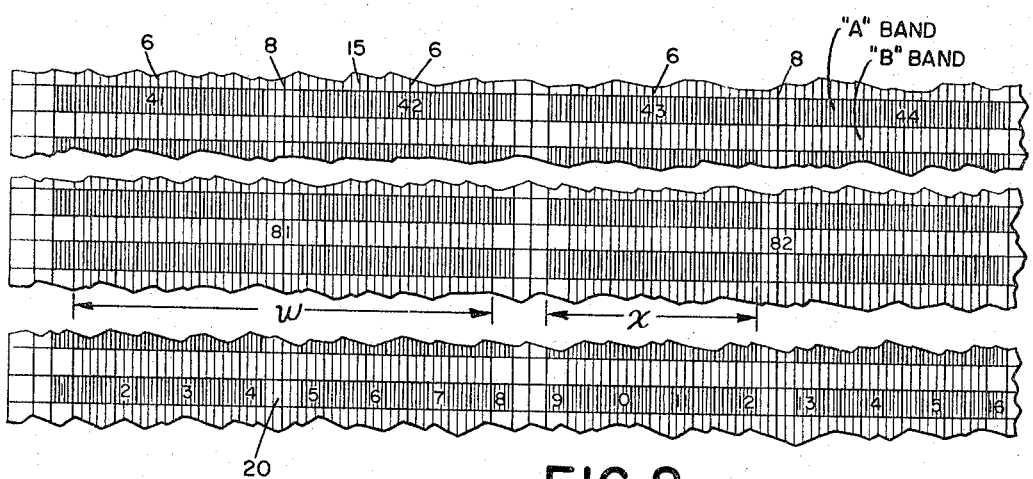

With reference to the drawing there is shown in FIG-URE 1 a front view of multichannel, direct writing oscillograph, and FIGURE 2 is a view showing a fragmentary portion of the specially ruled record chart to be used with the oscillograph shown in FIGURE 1.

With reference to FIGURE 1 there is shown a multichannel, direct writing oscillograph unit 10, into which are mounted two 80 mm. analog pen recorder devices 11, 12, one twin 40 mm. analog pen recorder 13, and one 8-pen multimarker unit 14. The twin 40's are mounted in a single housing and can be substituted in the oscillograph unit for one of the 80 mm. pen recorders if the engineer prefers two narrower channels of analog information to one wider channel. The 8-pen multimarker unit 14 is contained in one housing and likewise can be substituted for either one 80 mm. or for one twin 40 unit. The several pens write on a single wide sheet of specially ruled chart paper 15 which is driven past the pen tips in a manner known to the art, leaving traces thereon as shown. Ink is fed to the pens under pressure through tubes 16, from a manifold supply and valve device 17, as is described in detail in the aforementioned Schweitzer application.

Within the chassis 10 are amplifiers and preamplifiers for driving the pens in accordance with separate incoming signals, and adjustment means are provided for adjusting the pen amplitudes. An 80 mm. pen swings exactly twice as far as a 40 mm. pen per input volt to the preamplifier. The preamplifiers are calibrated in volts/division. The division being the narrow unit width printed on the chart paper.

In FIGURE 2 there is shown approximately one half width of a 4 channel record chart suitable for use in the oscillograph shown in FIGURE 1. There are two systems of grid lines, the first of which is used when reading the record made by an 80 mm. pen 80, and the second of which is used when reading the record made by a 40 mm. pen 40, or by one of the eight multimarker pens 4. Alternate transverse ruled bands are provided, the band marked 81, 82 being used to read the record made by the 80 mm. pens, and the band marked 41, 42, 43, 44 being used to read the 40 mm. pens, but the two grid systems are carefully integrated with each other. Each horizontal division in the 81, 82 band is exactly twice as wide as each horizontal division in the 41, 42, 43, 44 band. Consequently, the preamplifier calibrating dial setting is valid for both the 80 mm. and 40 mm. pens. The dial setting is in volts/division, with each division being 2% of the total swing for either pen.

There is a printed centerline 8 running through the center of each 80 mm. channel 81, 82. This is the centerline on which the 80 mm. pen is adjusted, and the pen's recorded swing will be read on the transverse bands 81, 82 and each alternate band which is similarly printed with fifty divisions per channel width. Four equally spaced centerlines are provided for the 40 mm. pens. These centerlines are identified by reference characters 6, and the trace recorded by the pens will be read on the transverse bands 41, 42 and each alternate band which is similarly printed with fifty divisions per 40 mm. channel width.

It will be seen that longitudinal lines used to define the incremental 80 mm. divisions are also used to help define the incremental 40 mm. divisions. Consequently, there is an extremely accurate horizontal relationship between the 80 and 40 mm. pens.

In order to separate the 40 mm. pens from each other so that they do not hit each other upon swinging wide, a space equivalent to ten of the 40 mm. divisions is established between them. Thus adjacent centerlines 6, 6 are sixty divisions apart, and the twin 40 mm. pens are mounted apart in their module a distance equal to sixty divisions on the chart paper. Because of the ten division separation between the 40 mm. channels, and because the width of each 40 mm. channel is equal to one half the width of the 80 mm. channel, the total width of the two 40 mm. channels plus their separation distance is ten "A" divisions wider than the 80 mm. channel.

The total width of the "A" transverse band for two 40 mm. pens is 110 "A" divisions. The 40 mm. channels are read on the "A" band of the chart and the 80 mm. channels are read on the "B" band of the chart. Thus there is provided a recording chart for a direct writing oscillograph whereon there can be recorded unambiguously one major channel or two minor channels on which is printed alternate bands transverse to the direction of motion of the chart during recording identified as "A" bands and "B" bands, and each of the "B" bands is divided into a given number of equal increments per given major channel width by "B" lines extending in the direction of motion of the record member, and each of the "A" bands is divided into the same number of equal increments per given minor channel width by "A" lines extending in the dirction of motion. The width of a "B" increment is twice the width of an "A" increment, and the "A" lines and the "B" lines are so located transversely that each successive "B" line exactly coincides with every second successive "A" line.

Each of the multimarker pens 4 has a five division channel. The "A" transverse band is used for reading the record of the multimarker pens. The 110 divisions of the "A" band provide for eight 5-division wide record channels plus seven 10-division wide separation channels. The middle separation channel 20 between pens 4 and 5 being the same as the ten "A" unit separation channel between the 40 mm. pens. Consequently, the "A" transverse bands are utilized to read the records made by the 40 mm. analog pens 40 and by the eight event marker pens.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is as follows:

1. In a multichannel direct writing oscillograph, the combination of a first direct writing instrument having a centerline and capable of lateral movement of its writing tip throughout a given distance $w$, a plurality of second direct writing instruments each having a centerline and each capable of lateral movement throughout a given distance $x$ which is less than the distance $w$, means mounting said plurality of second direct writing instruments side by side with a space between their centerlines which is greater than $x$ whereby the tips of the writing instruments do not touch each other in writing at said maximum amplitude $x$, a record chart having printed thereon two grid patterns superimposed on each other, one for said first instrument and the other(s) for said plurality of second instruments, and means for moving said record chart past said writing instruments.

2. In a multichannel direct writing oscillograph as set forth in claim 1, the further characterization that some only of the lines forming one of said grids are common to the other grid.

3. In a multichannel direct writing oscillograph as set forth in claim 1, the further characterization that the distance $w$ is twice the distance $x$, whereby at maximum amplitude the first writing instrument has twice the swing of said second writing instruments.

4. In a multichannel direct writing oscillograph as set forth in claim 3, the further characterization that the grids on said record chart are comprised of transversely extending lines defining transverse bands, said bands being divided into increments by longitudinally extending lines, every other band containing a given number of increments per unit length, and alternate bands containing twice said given number of increments per unit length.

5. In a multichannel direct writing oscillograph, the combination of a housing, a record chart in said housing, means for driving said record chart, a plurality of direct writing modules of different types for writing on said record chart, means for securing said different modules in said housing in any one of a variety of locations relative to each other for writing on said record chart, said record chart having on its surface a plurality of superimposed interrelated grids for conveying information in combination with the record lines applied to the chart by said writing modules, one of said grids conveying information in association with one module, and the other grid conveying information in association with a different module.

References Cited by the Examiner

UNITED STATES PATENTS

| | | | |
|---|---|---|---|
| 2,414,976 | 1/1947 | Redhed | 346—49 X |
| 2,805,113 | 9/1957 | Brown et al. | 346—49 |
| 3,251,142 | 5/1966 | Jazbutis | 346—136 X |

RICHARD B. WILKINSON, *Primary Examiner.*

J. W. HARTARY, *Assistant Examiner.*